United States Patent [19]
Alber et al.

[11] Patent Number: 6,067,852
[45] Date of Patent: May 30, 2000

[54] METHOD AND APPARATUS USING SLANT-PATH WATER DELAY ESTIMATES TO CORRECT GLOBAL POSITIONING SATELLITE SURVEY ERROR

[75] Inventors: Chris D. Alber, Eldora; Randolph H. Ware, Boulder; Christian Rocken, Boulder; Fredrick S. Solheim, Boulder, all of Colo.

[73] Assignee: University Corporation for Atmospheric Research, Boulder, Colo.

[21] Appl. No.: 08/946,154

[22] Filed: Oct. 7, 1997

Related U.S. Application Data

[60] Provisional application No. 60/056,999, Aug. 26, 1997.

[51] Int. Cl.$^7$ .................................................. G01C 21/00
[52] U.S. Cl. ............................................................ 73/178 R
[58] Field of Search .............................. 73/29.01, 170.16, 73/170.24, 170.27, 178 R; 340/998; 342/26, 450, 463, 357.03; 343/352, 357, 378, 422, 460, 5 W; 701/214, 215, 225

[56] References Cited

U.S. PATENT DOCUMENTS

| | | | |
|---|---|---|---|
| 4,310,884 | 1/1982 | Roberts et al. | 364/449 |
| 4,463,357 | 7/1984 | MacDoran | 343/460 |
| 4,613,864 | 9/1986 | Hofgen | 364/449 |
| 5,065,615 | 11/1991 | Hill | 73/29.01 |
| 5,428,358 | 6/1995 | Gardner | 364/420 |
| 5,477,458 | 12/1995 | Loomis | 342/357.03 |
| 5,526,676 | 6/1996 | Solheim et al. | 324/640 |
| 5,899,957 | 5/1999 | Loomis | 701/214 |

*Primary Examiner*—William Oen
*Attorney, Agent, or Firm*—Duft, Graziano & Forest, PC

[57] ABSTRACT

An atmospheric water vapor sensing system uses Global Positioning Satellites (GPS) to determine the refractivity and Slant-path Water Vapor Delay (SWD) between an Earth-based GPS receiver and a plurality of satellite-based GPS transmitters. The system provides improved precision in position calculation measurements by eliminating the refractivity effects of water vapor. No other system inputs are required apart from conventional GPS satellite signals and conventional satellite orbit data to implement the method. SWD arises from the refractivity in the integrated atmospheric water vapor in a column of atmosphere at an acute angular line-of-sight path between the Earth-based GPS receiver and any one of the plurality of satellite-based GPS transmitters. The system is especially useful in monitoring the Earth's crustal deformation.

22 Claims, 4 Drawing Sheets

6,067,852

METHOD AND APPARATUS USING SLANT-PATH WATER DELAY ESTIMATES TO CORRECT GLOBAL POSITIONING SATELLITE SURVEY ERROR

RELATED APPLICATIONS

This application is a regular utility application and a continuing application following provisional application 60/056,999 filed Aug. 26, 1997.

GOVERNMENT FUNDED INVENTION

This invention was made with Government support under Agreement No. ATM-9209181 awarded by the National Science Foundation. The Government has certain rights in this invention.

FIELD OF THE INVENTION

This invention relates to high resolution surveying systems and, in particular, to a system using satellite transmissions, such as those that may be obtained from global positioning satellites ("GPS"), for remote sensing of slant-path water delay, which is used to correct GPS survey errors that arise from variations in atmospheric water content.

PROBLEM

GPS systems are now in use throughout the world. The GPS industry grosses more than a billion dollars each year in sales and service by providing reliable, quick, and accurate position measurements. Even so, there are practical limits to the precision of measurement that is obtainable from GPS systems. Traditional GPS surveys can obtain −2 to 5 mm horizontal and −4 to 10 mm vertical precision over 1000 km baselines.

The GPS system was developed for navigation and time transfer, and was later demonstrated as a tool for highly accurate surveying. The GPS satellite network includes a constellation of twenty-one active satellites and three spares in six precise orbital planes over the Earth at high altitudes of about 20,000 km where the satellites broadcast 1.2 and 1.6 GHz carrier signals. These satellites contain atomic clocks that permit signal transmission at precise times. Most ground-based dedicated GPS receivers include a data almanac containing satellite positions by times.

The satellite typically orbit the Earth twice a day. Satellite monitoring stations on each orbit monitor ephemeris errors in a satellite's altitude, position, and speed. These errors are due to gravitational pulls from the moon and sun, as well as the pressure of solar radiation impinging upon the satellite. The ephemeris error corrections are uploaded to the respective satellites, which are programmed to broadcast corrections to their own position-indicating signals.

The GPS network also contains an array of hundreds of Earth-based GPS receivers deployed world wide. Each GPS satellite transmits two radio signals at different frequencies to provide the precise time and satellite position. A GPS receiver receives signals from at least three GPS transmitters to determine its precise location on the Earth using a triangulation method. A fourth satellite signal is conventionally used to correct for variations in the timing of signal transmissions with respect to other satellites.

GPS computers calculate position using conventional techniques to determine distance as a function of the velocity of light and time. The calculation of distance as a function of the velocity of light and time is complicated because the speed of light varies depending upon the content of the ionosphere and the atmosphere. The ionosphere includes a blanket of electrically charged particles at an altitude of about 80 to 120 miles above the Earth. These charged particles cause variations in the velocity of light passing through the ionosphere. GPS satellites broadcast signals of different frequencies to permit calculations that eliminate ionospheric errors. Earth-based GPS receivers of better quality process these dual signals to eliminate ionospheric errors. Atmospheric errors due to refractivity are more difficult to correct, and the variable portion in the refractivity of minor atmospheric components, such as water vapor, are traditionally ignored.

Commercially available software packages are capable of performing GPS position calculations, and these programs are accompanied by extensive documentation of the exact calculations and corresponding algorithms. One example of this type of well documented software is the Bernese software, which is described in Beutler et al, "GPS Software Version 4.0," Univ. Berne, (September, 1996). Other sources of GPS information are available, such as the International GPS Service precise orbits described in Neilan, "The Evolution of the IGS Global Network, Current Status and Future Prospects," International GPS Service for Geodynamics, 1994 Annual Report, JPL Pub. 95-18, 25–34 (1995).

There is a need for GPS surveying systems having better precision of measurement than can be obtained from existing systems. Highly accurate location measurements are needed to monitor the Earth's crustal deformation. Many cities are at risk of impending geologic catastrophes, such as earthquakes and volcanos. This risk is particularly acute in cities that are located in geologically active areas, such as ocean-continent subduction zones or rift zones. Scientists also need to monitor crustal deformation in areas that are not at substantial, risk, and it is difficult to justify the expense of building comprehensive fixed monitoring facilities in areas where risk is not severe. Present GPS systems lack the precision that is desirable for effective monitoring of the earth's crustal deformation.

Tsuji et al., "Tremors! Monitoring Crustal Deformation in Japan" GPS World pp. 18–29 (April 1996) describes how Japan's Geographic Survey Institute has monitored Japan's crustal deformation for about one-hundred years. In 1882, Japan's Geographic Survey Institute began the construction of a triangulation network using theolodytes constructed of stone monuments weighing sixty kilograms and wooden observation towers ranging from ten to fifteen meters in height. The old triangulation system became operational in 1911, and changed to a laser range finding system in 1970. The laser range finding system had a 1.5 cm error in ten km, which is referred to in the art as a 1.5 ppm accuracy. The laser range finding system has now been replaced by a system providing GPS surveys from a plurality of fixed towers. The Tsuji et al article states that present GPS surveys can produce relative accuracies of ten parts per billion, i.e., about ten mm across ten km. This level of accuracy is mandatory for crustal deformation studies.

The state of the art now is that atmospheric water content provides the principal uncorrected source of error in high resolution GPS surveys. Three atmospheric constituents are based on water in its various forms including liquid (water), solid (ice) and gas (vapor). Although at any one time approximately 99% of the Earth's water is in liquid and solid form, water vapor is an important and highly variable atmospheric constituent that acts over a wide range of temporal and spatial scales. The combined effects of rain, snow, and ice particles are typically twenty times less than the effect of atmospheric water vapor on GPS position determinations.

Many factors including pressure, temperature, and proximity to a water source can determine the quantity of water vapor in the atmosphere. For example, atmospheric water vapor content ranges from at or near 0% to about 4% by volume depending on the temperature and availability of liquid water. Water vapor content is also highest in moist and/or low pressure regions, and it is lowest in arid and/or high pressure regions. Further, only a certain maximum volume of water vapor is possible per volume of air depending on the temperature. As the air warms and/or pressure decreases, the maximum possible water vapor content increases. Alternatively, as the air cools and/or the pressure increases, the water vapor content decreases. Once the maximum water vapor content or saturation threshold is reached for any given temperature, the excess water vapor is released as condensation and/or precipitation in the form of rain or ice.

There is a need for using the GPS system to measure atmospheric water vapor in correcting for the effects of water vapor refractivity that induce errors in GPS position calculations. Existing methods for detecting and quantifying water vapor are undesirable because they can only be implemented on a local scale over land thereby leaving vast gaps in global meteorological continuity. The largest gaps occur over oceans where most atmospheric conditions originate. Although the existing atmospheric sensing systems listed below exhibit high resolution capabilities on a local scale, it is not practical to deploy such systems on a global scale because they are expensive to implement or maintain on a global scale and they lack adequate temporal and/or spatial resolution for realistic use on a global scale.

The radiosonde, an expendable balloon-borne instrument package that relays temperature, humidity, and pressure data to a ground receiver by radio signals, is the traditional cornerstone of the worldwide operational weather analysis and prediction system through deployments twice daily at several hundred sites around the world. However, the twice daily radiosonde deployments are primarily over land and are sparsely distributed due to cost considerations. For these reasons, radiosonde data is too costly and localized to support high resolution global meteorology.

Commercials air carriers presently provide real-time wind, pressure, temperature, and humidity readings around the world as part of a system called Aeronautical Communications Addressing and Reporting System (ACARS). Although the ACARS system provides about 10,000 readings per day world wide at a cost about 100 times less than the recurring cost of radiosondes, the vast majority of ACARS readings are taken around airports and along common flight paths at established cruise flight levels which limits the spatial scope of this otherwise valuable data.

Earth-based Differential Absorption Lidar (DIAL) and Raman Lidar systems are used to provide wind and water vapor profiles in remote areas. However, such systems are not economic to install and maintain, they do not penetrate cloud cover, and the lasers used are highly energized and are therefore not eye-safe.

Water vapor radiometers are instruments that measure microwave energy emitted by the atmosphere to estimate integrated water vapor. Integrated water vapor ("IWV") is a measure of the depth of liquid water that would result if a column of water vapor were condensed into liquid water. Earth-based upward-looking water vapor radiometers estimate IWV by measuring radiative brightness temperatures against the cold background of space. However, upward-looking water vapor radiometers must be "tuned" to local conditions using independently obtained atmospheric profile, and although they generally exhibit good temporal resolution in relatively clear atmospheric conditions, they provide only localized IWV data. Further, unless properly equipped upward-looking radiometers are virtually useless in rain. Alternatively, satellite-based downward-looking radiometers perform well over water and consistent temperature land masses by viewing microwave emissions from the atmosphere and the underlying Earth's surface. However, although downward-looking radiometers generally exhibit good spatial resolution they exhibit poor temporal resolution and perform poorly over most land masses. In either case, water vapor radiometers as a whole are not practical for global scale meteorology due to their cost, limited view, and performance characteristics.

Fourier Transform Infrared Radiometer (FTIR) systems can provide high resolution satellite-based and Earth-based temperature and water vapor profiles by using a recursive solution of the radiative transfer equation to provide a vertical profile from the ground up. Although this method can provide vertical resolution of several hundred meters to a kilometer in the lower troposphere, the system exhibits poor performance in the presence of cloud cover and infrared active gases such as tropospheric ozone.

Unmanned Air Vehicles (UAV's) provide high resolution data in regions inaccessible to other systems discussed above. However, unmanned aircraft are too costly for continuous global sensing, they lack adequate spatial and temporal resolution and are typically only justified in specialized research applications.

The GPS system can also be used to produce high resolution atmospheric tomography by integrating the IWV measurements from Earth-based GPS receivers with radio occultation measurements from at least one Low Earth Orbiting (LEO) satellite. As used herein, the phrase "atmospheric tomography" refers to a profile of structure in the atmosphere constructed from water vapor measurements gathered at points within the atmosphere where a zenithal GPS signal received by an Earth-based GPS receiver intersect with a horizontal GPS signal received by a LEO. A LEO satellite orbits the Earth faster than the higher orbit GPS satellites so that a GPS signal received by a LEO satellite transects the Earth's atmosphere in the moments prior to the GPS signal being eclipsed by the Earth. The transecting GPS signal slices the atmosphere along a long horizontal limb path, thereby revealing important structural information because the signal is subject to a time series of Doppler shifts due to the refractive index of the atmosphere. However, one disadvantage with the radio occultation technique is that it produces only periodic soundings that occur at different points around the Earth due to the difference in LEO and GPS satellite orbital periods. Another disadvantage is that soundings using the radio occultation technique are limited in spatial usefulness because the long horizontal limb path measurements are smeared along at least a 200 km horizontal section of the atmosphere with relatively few intersecting zenithal PWV soundings therebetween for reference points.

The GPS geodetic method described by Dixon in "An Introduction to the Global Positioning System and Some Geological Applications", Rev. Geophys., 29, 249–276, (1991), provides a method for using the GPS system to estimate atmospheric zenith path delay. The existing technique for atmospheric sensing of water vapor using the GPS system is limited primarily due to the assumption of atmospheric symmetry, minimal error compensation, and zenith-only path delay estimations over land masses. The GPS system uses all incoming GPS signals at once and the assumption of atmospheric symmetry induces corresponding errors.

Zenith path corrections according to the Dixon article are inadequate because the assumption of uniform atmospheric symmetry is invalid. Rocken et al, "The Measurement of Atmospheric Water Vapor: Radiometer Comparison and Spatial Variations, IEEE Trans. Geosci. & Remote Sensing, 29, 3–8, (1991) reports a twenty percent azimuthal variation in radiometer measurements of integrated water vapor at 30° elevation. These variations are significant to GPS position calculations.

In the past, crude attempts have been made to remove errors due to slant water path delay from GPS position calculations, however, expensive and bulky equipment is required and the precision of measurement could still improve. Rocken et al., "Sensing Atmospheric Water Vapor with the Global Positioning System," Geophys. Res. Lett., 20, 2631–2634, (1993), reports one such attempt which used pointed radiometers to track GPS satellites for the estimation of slant path water vapor. The vapor estimate was converted into an estimate of slant path wet delay. These types of experiments result in root mean square precision estimates ranging from 2.6 to 12 mm.

For the reasons stated above, there exists a need for a simplified GPS survey system that corrects for GPS survey errors that derive from water vapor content. This need has heretofore not been satisfied.

SOLUTION

The problems described above are solved and a technical advance is achieved in the field by correcting for GPS survey errors that derive from azimuthal variations in the refractivity of atmospheric water vapor. No other apparatus is required for implementing these corrections other than the GPS receiver and computer. Slight modifications to the conventional GPS position calculations are made to implement these corrections, as described below. Thus, the GPS position calculation method facilitates a significant improvement in the precision of measurement, which may be advantageously accomplished through use of equipment that is not so expensive and bulky as the prior slant water path delay correction techniques which made use of radiometers. The methodology of the present invention lends itself equally well to a variety of satellite positioning systems and related equipment including the Japanese GPS augmentation system (see, e.g., Divis, *Getting a Fix on Japan's Nav Plans*, GPS World pp. 14–20 (July 1997) and the Russian GLONASS system (see, e.g., Langley, *GLONASS: Review and Update*, GPS World pp. 46–51 (July 1997).

It has been discovered that GPS position calculations using independent estimates of atmospheric water vapor permits precision of measurement to a root mean square vertical precision of 1.2 mm and sub-millimeter precision on the horizontal scale. Modified radiometers were used as the independent source of measurement to obtain this extremely high survey precision. In addition, GPS antennae were fitted with choke collars 25 cm in width to eliminate ground-reflected multipath for this purpose. This level of precision significantly enhances the ability of scientists to monitor the Earth's crustal deformation and to perform high precision gravimetric assays.

Parent application Ser. No. 08/566,841 filed Dec. 4, 1995 teaches that global positioning satellites can be used to calculate the atmospheric slant path water delay and corresponding integrated water vapor column. According to the parent application, It is first necessary to calculate a position using conventional methods before the slant path water delay can be calculated, but independently obtained tomography profiles and radiometer data can also be used to calculate the slant water path. It has also been discovered that a network of GPS receivers can provide an accurate assessment of slant path water vapor on par with the best data obtainable from modified radiometers with augmentation to eliminate multipath. If anything, the GPS data is even better than the radiometer data because the GPS receivers are less costly and more mobile, and the GPS receivers can perform measurements with a shorter observation window and under all weather conditions.

According to the method and apparatus of the invention, GPS signals from existing satellite-based GPS transmitters are received by standard dual frequency Earth-based GPS receivers in a manner that is well known and practiced in the art. The GPS signals are received at an acute angle relative to the local geometric horizon and are processed in a novel manner that determines the excess path delay of a GPS signal along the elevated propagation path or "slant-path" between a satellite-based GPS transmitter and an Earth-based GPS receiver. The excess path delay is determined from the total refractivity-induced signal delay along the slant-path.

A Slant-path Water Delay ("SWD") measurement technique is based on the principle that electromagnetic radiation such as a radio or microwave transmission is refracted and retarded as it passes through the atmosphere. The refraction causes a "path delay" in the GPS signal. This delay is induced by atmospheric constituents including water vapor. The path delay has a direct relationship to the present atmospheric temperature, pressure, and water vapor local to the slant-path of the GPS signal. Factoring refractivity or SWD measurements into GPS survey measurements enhances the precision that is obtainable from these measurements in positional surveys. Position calculations are more accurate because the SWD is subtracted from the total delay before position is calculated. Thus, precision of the conventional position calculation method is improved by subtracting atmospheric water vapor delays from the total path delay prior to entering the conventional position calculation.

Reliable SWD measurements require exact positioning of high precision transmitters and receivers with stable high frequency signals therebetween. These stable high frequency signals are globally available from any number of existing satellite-based sources including, but not limited to, communications, radio, television, and radar networks. The GPS system is the preferred signal source because it is a highly reliable network of highly stable satellite-based transmitters already in place and designed for complete global coverage. Any other radio transmission source having a known location may be used according to the methodology that is described herein.

A feature of the present invention is to provide a system calibration technique that includes obtaining an independent water vapor measurement local to at least one Earth-based GPS receiver. These independent water vapor measurements can be obtained using a water vapor radiometer or by positioning an Earth-based GPS receiver where there is a known water vapor content, such as a mountain top or desert region. The system calibration can be uploaded to a satellite for transmission to GPS receivers that are capable of using the water vapor measurement to calculate more precise positions, but are separated from any other independent source of water vapor measurements.

In the most preferred embodiment, a plurality of GPS receivers capable of correcting position measurement data for SWD are located at respective receiving-stations that are each fixed in position with respect to the Earth's surface. Suitable means of affixing the receiving stations include bolting the station superstructure to pilings or the like that are driven beneath the Earth's surface, e.g., to bedrock. A plurality of these positionally fixed GPS receiving stations are located in geologically active areas, e.g., along fault lines, areas that exhibit active volcanism, rift zones, overthrust regions or subduction zones. Certain ones of GPS receivers in the network calculate slant water delay where the exact positions of these receivers are known, and these slant path water measurements are averaged for use in position calculations by other GPS receivers in the array.

Fixed GPS receiving stations are placed in areas where the acts of man induce corresponding surface crustal deformations, such as areas where large amounts of geological resources including ore, oil, gas, or water have been removed or injected into naturally occurring reservoirs. In yet other embodiments, fixed GPS-receiving stations are placed proximate nuclear power generation plants or urban areas to monitor in a diagnostic mode the after-effects of earthquakes, or to monitor in predictive fashion crustal deformations that may indicate a need for evacuation. In still other embodiments, a network of GPS receivers is attached to an airplane or truck for use in gravimetric assays to locate ore bodies or petroleum deposits.

DETAILED DESCRIPTION

Figure 1:
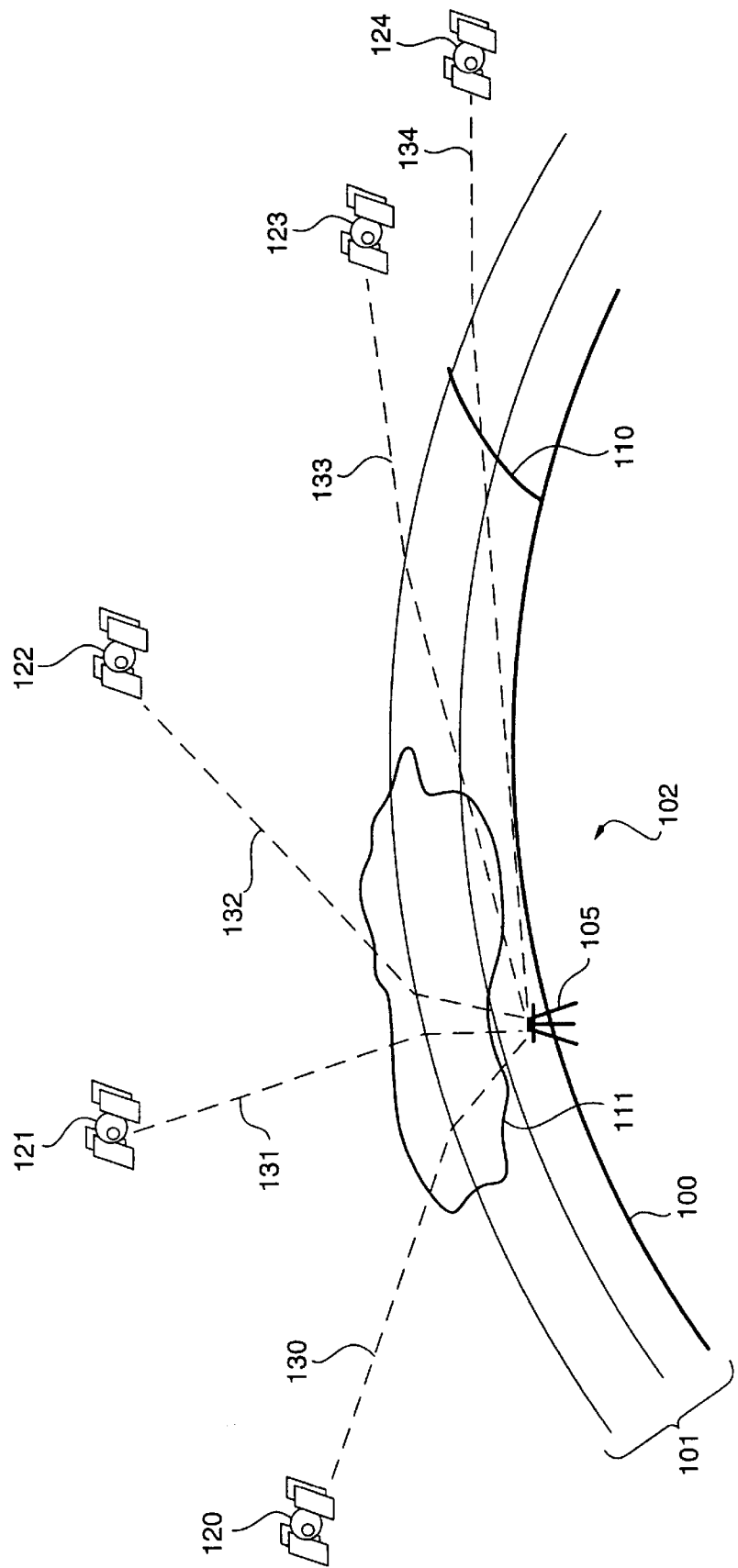
FIG. 1 illustrates one Earth-based GPS receiver for making GPS signal measurements from which GPS positions are calculated using corrections for slant water path delay.

The GPS System and Atmospheric Refractivity Information

Radio propagation in the atmosphere is retarded (delayed) by the neutral "dry" atmospheric constituents and by atmospheric water vapor. The total atmospheric delay for radio propagation is conventionally determined from GPS measurements by making a stochastic or least squares estimate of the atmospheric delay to optimize a least squares fit of GPS data in position determination. In this process, a uniform atmospheric distribution is assumed, which results in error due to position calculation measurements that depend on the assumption of azimuthal symmetry in wet refractivity delays when, in actuality, wet refractivity delays are azimuthally variable due to localized differences in atmospheric water content.

Non-idealized atmospheres are not azimuthally symmetric about the Earth-based GPS receiver. On the other hand, conventional GPS calculations correct for atmospheric effects by assuming azimuthal symmetry to calculate a quality which is known as the total zenith delay, and is based upon an idealized vertically propagating radio wave.

This total zenith delay is due to the refractivity N of the total atmosphere integrated along a zenith propagation path to the top of the atmosphere:

$$\text{total zenith delay} = \int_{GPSantenna}^{\infty} N_{total} dz \quad (1)$$

where the total zenith delay and dz have units of length in the zenith, and $N_{total}$ is the total refractivity due to the respective dry atmosphere and water vapor refractivity components. $N_{total}$ can be expressed, according to Formula (2), as a function of the local dry and local vapor densities $\rho_{dry}$ and $\rho_{vapor}$, R is the ideal gas constant, and T is the local temperature of the water vapor in degrees Kelvin:

$$T_{total} = N_{dry} + N_{vapor} = 77.6\rho_{dry}R + 64.8\rho_{vapor}R + 377600\rho_{vapor}\frac{1}{T} \quad (2)$$

where $$N_{dry} = 77.6\rho_{dry}R \quad (3)$$

and $$N_{vapor} = 64.8\rho_{vapor}R + 377600\rho_{vapor}\frac{R}{T} \quad (4)$$

The dry component of zenith delay can be independently measured by determining the total amount of atmosphere above the Earth-based GPS receiver. This determination is accomplished by using a barometer to obtain a barometric pressure measurement local to the receiver. Subtracting the dry component from the total zenith delay yields the delay due to atmospheric water vapor, which is known as the zenith wet delay (ZWD):

$$ZWD = \text{total zenith delay} - \text{zenith dry delay} \quad (5)$$

The zenith wet delay is due to the integrated amount of water vapor along the zenith propagation path:

$$ZWD = \int_{GPSantenna}^{\infty} N_{vapor} dz \quad (6)$$

The total amount of water vapor along the zenith path is proportional to the ZWD, with a slight dependence upon the temperature of the water vapor. This temperature dependence can be averaged into a mean vapor temperature which can then be correlated to surface measurements of ambient temperature. The PWV is therefore related to ZWD by the following formula:

$$PWV = ZWD \times \Pi \quad (7)$$

where $\Pi$ is a weakly temperature dependent dimensionless constant equal to approximately 0.15. $\Pi$ can be estimated to within about 2% from a surface temperature measurement. However, a uniformly stratified atmosphere and azimuthal symmetry is necessarily assumed in the PWV estimation technique; therefore, no spatial structure of the water vapor can be determined.

SWD Refractivity Measurements

FIG. 1

FIG. 1 illustrates the atmospheric water vapor sensing system of the present invention using the GPS system and one Earth-based GPS receiver to make GPS signal measurements from which excess path delay is determined. Total refractivity due to water vapor is determined from the excess path delay and a specific SWD or SWV measurement can be further determined if desired.

The full GPS network of twenty-one active transmitting satellites and three spares is simplified in the present illustration by showing only five transmitting satellites 120–124 and one receiver 105 on the Earth's surface 100. At any time, receiver 105 can receive simultaneous respective signals 130–134 from the corresponding GPS satellites 120–124. Each signal 130–134 is refracted and retarded as it passes through the Earth's atmosphere 101 due to atmospheric constituents including, but not limited to, water vapor. Atmospheric structure 110 is a cold front moving toward receiver 105 while affecting signal 134.

Receiver 105 is a standard GPS receiver device that is capable of receiving a plurality of simultaneous GPS signals. Specifically, the GPS receiver 105 measures phase angles of each of the radio carriers received which are then processed in a novel manner to determine the excess path delay or SWD in the GPS signal due to the refraction and retardation of the GPS signals 130–134 along the signal's slant-path due to water vapor. The slant-path being measured follows an acute angular "line-of-sight" path through the atmosphere 101 down to a zero angle relative to the geometric horizon, or an angle of slightly less than zero may be obtained due to refraction.

Slant-path GPS signals used for SWD and/or refractivity measurements traverse large sections of the atmosphere thereby facilitating measurements over land and water and significantly increasing the atmospheric water vapor sensing system's spatial resolution. For example, a ten degree slant-path between a GPS transmitter and a receiver relative to the geometric horizon results in a horizontal range of about 34 km through the lower 6 km of the troposphere and the horizontal range of a zero-degree slant path below 6 km is more than 300 km. Because the lower 6 km of troposphere contains approximately 90% of the water vapor in the atmosphere, a single GPS receiver receiving GPS signals from 4 to 12 GPS satellites within its range can sense the distribution of water vapor over a region as large as 600 km diameter.

Signals 130–134 illustrate the refracting of the GPS signals due to atmospheric water vapor generally, and specifically due to atmospheric structure in a GPS signal's path such as cold front 110 for GPS signal 134 or cloud cover 111 for GPS signals 130–133. Factoring the refractivity-induced delay measurements directly into a weather forecasting model reveals valuable information about local, regional, and global atmospheric conditions in the present and future. A refractivity-induced delay is affected by many components including, but not limited to, wet delay, hydrostatic delay, and signal error for each slant-path GPS signal. Specifically, water vapor increases the GPS radio propagation along a slant-path by an amount:

$$SWD = \int_{GPSantenna}^{GPSsatellite} N_{vapor} ds \qquad (8)$$

where SWD is the Slant-path Wet Delay along the line-of-sight between the satellite-based GPS transmitter and the Earth-based GPS receiver, SWD and ds have units of distance along the line of sight, and N is defined by equations (2)–(4) above. As a reasonable approximation for satellite elevation angles greater than 20°, SWD is related to ZWD as SWD being approximately equal to ZWD times the cosecant of the elevation angle. SWD is related to SWV by:

$$SWV = SWD \times II \qquad (9)$$

where II is a dimensionless conversion factor approximately equal to 0.15. Although II will vary slightly with the elevation angle above the geometric horizon, it can be estimated on average with an accuracy of about 2% based on surface temperature measurements as described above in the zenith case for PWV.

Modeling each GPS receiver's observation in terms of a geometric range such as the observed value minus the computed value, produces the wet delay in the direction of the GPS signal. Because the GPS signal's angular elevation, time sent, time received, range, and time delay are known, the total wet delay along a slant-path can be determined. With each Earth-based GPS receiver typically measuring GPS signals at thirty second intervals from as many as about twelve satellite-based GPS transmitters at one time, thousands of measurements are possible per receiver per day.

In operation, receiver 105 may be used to measure SWD. The SWD measurements are transmitted to GPS satellites, which broadcast the SWD data for position calculation use by other GPS receivers proximal receiver 105. Alternatively, receiver 105 receives SWD data from an independent source, e.g., a network of other GPS receivers that average SWD data over the region where receiver 105 resides, independent tomography profiles that are obtained according to any conventional means, and localized radiometer data.

GPS Receiver Array

FIG. 2

Figure 2:
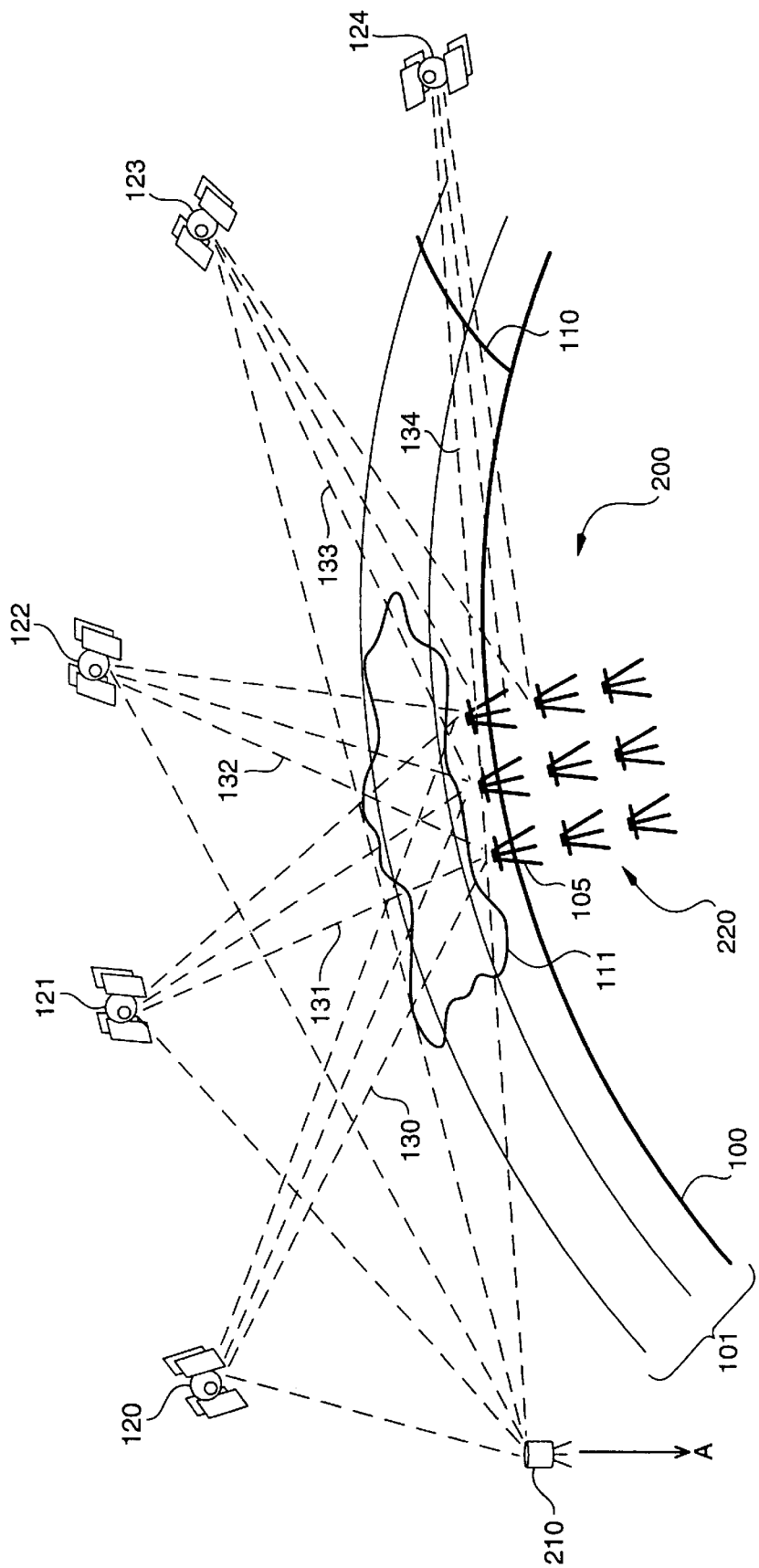
FIG. 2 illustrates a receiver array for making multiple simultaneous GPS signal measurements having improved precision with respect to the FIG. 1 embodiment.

FIG. 2 illustrates a preferred embodiment of the atmospheric water vapor sensing system 200. FIG. 2 includes all that is disclosed in FIG. 1 with the addition of a receiver array 220 including a plurality of receivers, such as receiver 105. Each Earth-based GPS receiver in a differential receiver array 220 functions as does receiver 105 described in FIG. 1. In contrast to the single receiver system depicted in FIG. 1, the need for knowing the satellite-based GPS transmitter 'clock differencing' is resolved because there are multiple receiver references available from which the clock differencing can be determined. Clock errors can be nearly eliminated by a double differencing technique. Specifically, double differencing eliminates GPS transmitter and receiver clock errors, and can be expressed as:

$$\text{double difference} = (\phi_{A1} - \phi_{B1}) - (\phi_{A2} - \phi_{B2}), \qquad (11)$$

where $\phi_{A1}$ is the carrier phase observation of satellite 1 from site A on the Earth's surface, $\phi_{B1}$ is the carrier phase observation of satellite 1 from site B on the Earth's surface, $\phi_{A2}$ is the carrier phase observation of satellite 2 from site A on the Earth's surface, and $\phi_{B2}$ is the carrier phase observation of satellite 2 from site B on the Earth's surface.

The above Equation (11) can be written in matrix form to describe a system of N satellites having N−1 differences, i.e., a GPS double difference matrix. The matrix may be inverted to obtain single differences, but the inversion requires a solution of N equations for N−1 differences. Thus, an additional constraint is required to invert the matrix. It has been discovered that an additional constraint may be forced upon the solution to require the average zenith path delay for the system of N satellites to match the average zenith path delay calculated for all of the satellites that are being difference. The resultant single difference can be used for mapping GPS antenna phase center and multipath characteristics where the baseline is less than about 100 meters. The single difference can be used to obtain the differential slant delay between two sites for baselines greater than about 100 meters. Thus, a radiometer at one of the sites in a GPS observation network can be used to determine slant delay at the other sites. The further inversion of GPS single differences can be used to obtain slant path delay, i.e., GPS zero differences.

The preferred receiver array 220 embodiment is a group of densely spaced Earth-based GPS receivers having an improved spatial resolution, as compared to a stand-alone Earth-based GPS receiver 105. The spacing between receivers in receiver array 220 can be random or in a more organized grid configuration. The receiver array 220 in FIG. 2 is neither intended as a minimum nor maximum density of Earth-based GPS receivers. Rather, the receiver array 220 is intended to illustrate that the more densely spaced the receivers, the better the spatial resolution of a defined area. For this reason, the practical number of receivers in receiver array 220 and the physical location of receiver array 220 is determined by the need for higher precision in position measurements. Areas where higher precision can be useful include geologically active areas of the Earth where earthquakes and volcanos are known to occur and, particularly, cities or other heavily populated areas.

A conventional dual frequency GPS receiver is the preferred receiver type for receiver array 220 because the dual frequency feature removes ionospheric delay. Ionospheric delay is another of the total refractivity delay components that must be removed to determine the refractivity due to water vapor. One alternative to using only the relatively expensive dual frequency GPS receivers in receiver array 220 is to use less expensive single frequency GPS receivers, provided that an independent measure of ionospheric delay is available for each single frequency GPS receiver. In other alternatives, the GPS receivers can be placed very close, which permits the use of an assumption that the ionospheric delay is the same at each station. Another alternative to using only the relatively expensive dual frequency GPS receivers in receiver array 220 is to space dual frequency GPS receivers by about 10–50 km in receiver array 220 and fill in the less expensive single frequency GPS receivers therebetween at the density necessary to produce the desired resolution of weather information. One requirement of a receiver array containing both single and dual frequency GPS receivers is that the dual frequency GPS receivers must be spaced at intervals which are smaller than the scale of ionospheric structures that would generate unacceptable error.

Self calibration and absolute tropospheric estimations of atmospheric water delays are possible for receiver array 220 provided there at least two Earth-based GPS receivers separated from each other by at least 500 km. The 500 km requirement is necessary because the elevation angle between any two Earth-based GPS receivers in receiver array 220 and any one GPS transmitter 120–124 would otherwise be nearly indistinguishable. With separation of at least 500 km, ZWD can be computed from barometric pressure and GPS signal measurements alone, according to Formulae (1)–(7).

Other receiver calibration alternatives are available that obtain accurate ZWD estimates within receiver array 220 if receiver separation of less than 500 km exists between at least two Earth-based GPS receivers. A first alternative to the separation requirement is to independently determine for ZWD at least one Earth-based GPS receiver site in receiver array 220 by way of a water vapor radiometer or other water vapor sensing device capable of measuring integrated water vapor with a resolution at or about 1–2 mm. A ZWD estimate can then be obtained based on the difference between the reference site measurements and the second receiver site measurement added to the absolute value of the SWV measure from any Earth-based GPS receiver in receiver array 220.

A final calibration alternative for Earth-based GPS receivers separated by less than 500 km in receiver array 220 is to place at least one Earth-based receiver in a location known to have consistently zero or otherwise stable and known humidity levels and water vapor distributions.

Determining Excess Path Delay and SWD

FIG. 3

Figure 3:
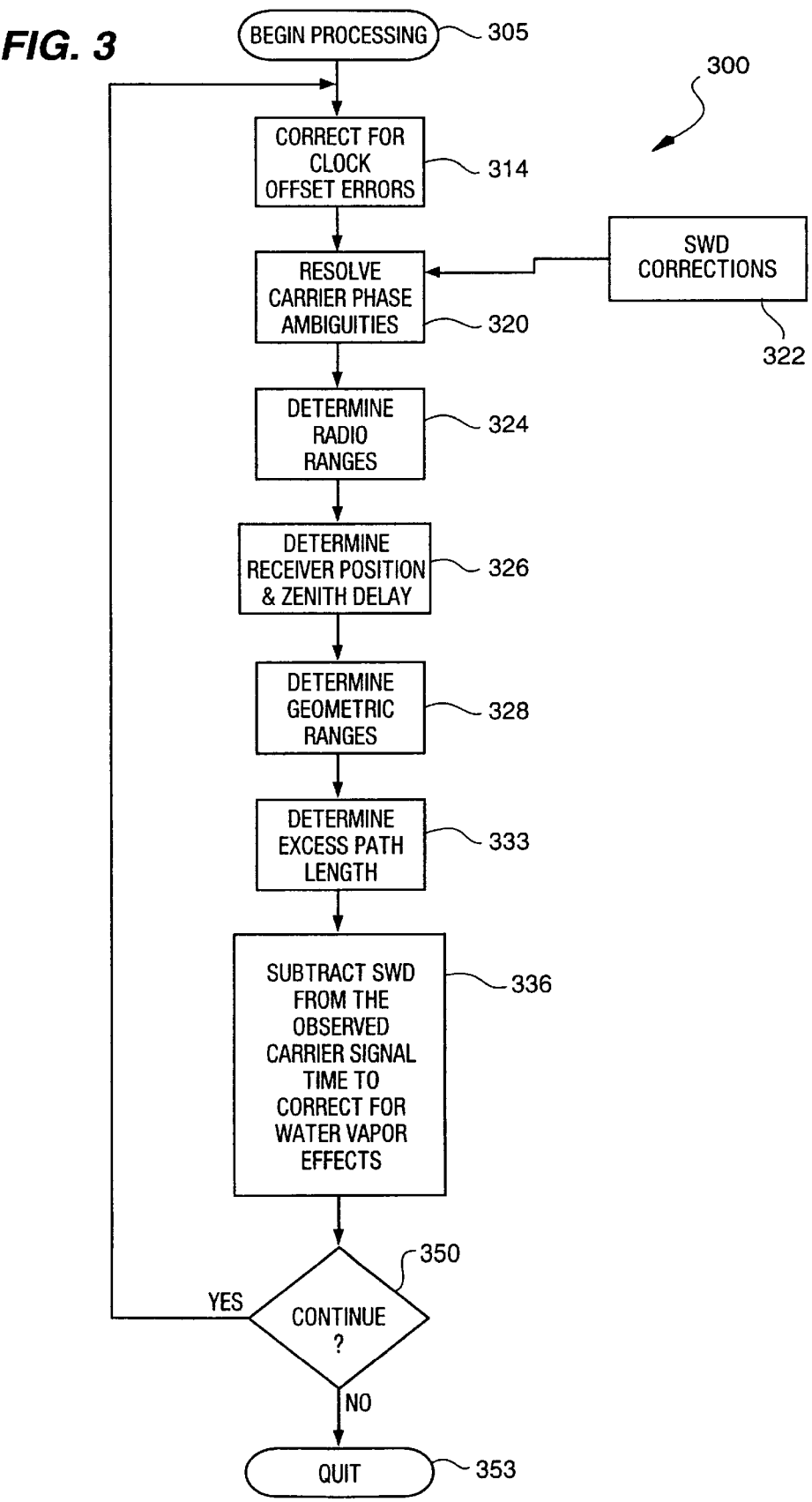
FIG. 3 illustrates, in flow diagram form, the steps taken in processing GPS signal measurements to calculate position according to the present invention.

FIG. 3 illustrates the operational steps 300 in flow diagram form for determining excess path delay and SWD. The operational steps 300 begin at step 305 with an operational network of satellite-based GPS transmitters 120–124 (see FIGS. 1 and 2) and at least one operational Earth-based GPS receiver 105 and preferably a receiver array 220 capable of maintaining continuous signal contact with at least one satellite-based GPS transmitter 120–124. The operational steps 300 assume the use of low multi-path GPS receiver antennas and a low multi-path antenna environment. Multi-path is a highly localized error caused by signal reflections from objects located at or near the antenna of a GPS receiver and is often accompanied by receiver antenna phase delay variations that repeat in sidereal time. Objects known to cause multi-path errors include, but are not limited to, the ground below a receiver antenna, trees, buildings, and terrain proximal to the GPS receiver antenna. In practicing the present invention using radiometer-derived SWD measurements, it is important to augment the GPS antennae with ring-shaped collars to reduce multipath. Extreme precision is only obtainable from radiometer data once multi-path has been substantially reduced.

The clock offset for each satellite-based GPS transmitter is removed at step 314, e.g., by the double differencing technique of Formula (11). Disparities between transmitter and receiver clocks are also resolved at step 31 to accurately determine signal delay and subsequently the geometric range between the satellite-based GPS transmitter and each Earth-based GPS receiver. Resolving clock differences is important because receiver clock resolution is approximately $10^{-8}$ seconds and transmitter clock resolution is approximately $10^{-13}$. Even a one nanosecond $10^{-9}$ difference in clocks can equal one foot in positioning or an equivalent loss in SWD precision.

The location of an Earth-based GPS receiver such as 105 (see FIGS. 1 and 2) is determined by steps 314–326, based on information available in GPS signals 130–134. High precision positioning is attained by determining the number of carrier wavelengths occurring between an active GPS transmitter and an Earth-based GPS receiver. The wavelength determination includes the integer number of wavelengths that have occurred, and any residual fractional wavelength.

Determining the position of an Earth-based GPS receiver includes compensating for orbital variations of individual satellite-based GPS transmitters, multi-path noise, dry atmospheric delay, and ionospheric refractivity. The preferred technique for these position calculations is that which is incorporated in Bernese software, which is described in Beutler et al, "GPS Software Version 4.0," Univ. Berne, (September, 1996). Other similar programs are commercially available and are available from academic sources at various other universities. These other programs may also be used to practice the invention.

Orbital variation errors for the satellite-based GPS transmitters are reduced by conventional means using orbit predictions or real-time orbit estimations based on published orbit information or triangulation from at least four Earth-based GPS receivers. Conventional alternatives to eliminating multi-path noise include, but are not limited to, improving receiver antenna hardware, and operating the Earth-based GPS receivers in areas that are free of reflective surfaces. Ionospheric delay is eliminated by conventional signal processing because the delay is substantially proportional to the inverse square of the GPS signal's frequency so that the delay is correctable by correlating the two signal frequencies over which a GPS signal is transmitted.

Carrier phase ambiguities are resolved at step 320. A carrier phase ambiguity is the uncertainty in the integer number of wavelengths or carrier cycles occurring in the distance between a satellite-based GPS transmitter and an Earth-based GPS receiver. Resolving carrier phase ambiguity is accomplished according to conventional techniques by observing the time series of GPS observables and determining the integer values that are required to fulfill the distance constraints as each satellite-based GPS transmitter progresses in its respective orbit. Determining the integer value that is required to fulfill the distance constraint plus determining the residual phase angle of the GPS signal's carrier phase yields the radio range between a satellite-based GPS transmitter and an Earth-based GPS receiver.

In step 322, SWV is known from other sources, e.g., radiometer measurements, results from a boundary layer refractivity model, tomography profiles, atmospheric water vapor measurements obtained from at least one other radio receiver and, preferably, combinations thereof. Other GPS receivers in array 200 (see FIG. 2) may use Formula (9) to calculate SWD. This SWD value may be subtracted from the satellite carrier signal propagation time to correct the signal for atmospheric water vapor effects. The GPS SWD measurement times are contemporaneous with the satellite signal propagation times upon which the position calculations are based and, consequently, better reflect atmospheric conditions at the actual time that the position signals are received.

Other methods for obtaining an independent SWD measurement include GPS Doppler observations for refractivity profiling. These observations may be coupled with an atmospheric radiative transfer model, which may be used to train an adaptive filter or neural network to map the doper observations to synthetic SWD measurements. These GPS Doppler measurements are believed to be extremely useful in determining the acceleration of a moving platform, e.g., for use in airborne gravimetry.

Conventional GPS position measurements may be used in conjunction with observations by an accelerometer to obtain SWD from a moving platform. Water vapor causes an apparent acceleration in GPS observations that is not seen by an accelerometer attached to a moving platform. The differences between the acceleration seen using GPS observations and the acceleration measured by the accelerometer can be used to obtain the water vapor affecting the GPS observations.

Step 324 includes determining the radio range, which is the GPS signal distance along the refracted and retarded slant-path between the satellite-based GPS transmitter and the Earth-based GPS receiver. This radio range is determined by conventional means including multiplication of the carrier signal wavelength in vacuum times the integer and residual phase angle that is determined in step 320.

The position of an Earth-based GPS receiver is determined with centimeter accuracy at step 326 using conventional methods established for high-accuracy GPS geodesy. The geometric range along the slant-path between a satellite-based GPS transmitter and an Earth-based GPS receiver is determined at step 328. The geometric range is determined by calculating the straight-line distance between the now-known Earth-based GPS receiver position and the satellite-based GPS transmitter position based upon almanac data including the satellite positions at particular times and corrections for ephemeris errors that are broadcast by the respective satellites.

The excess path length along the slant-path between the satellite-based GPS transmitter and the Earth-based GPS receiver is determined at step 333. The excess path length for any slant-path signal is the difference between the radio range and the geometric range as determined from steps 324 to 328. The total refractivity measurement $N_{total}$ is proportional to the excess path length along the slant-path as determined at step 336, according to Formula (8). Alternatively, SWD can be determined at step 336 based on the excess path length from step 328 by subtracting out the hydrostatic delay determined from a barometric weighing of the atmosphere.

In step 338, SWD is computed based on Formulae (1)–(9). SWD is then subtracted from the total time that was observed for the satellite signal to reach the GPS receiver, e.g., from satellite 120 to receiver 105 in FIG. 2. The subtraction of SWD corrects the signal propagation time for the effects of water vapor. At decision step 350, the system determines whether to repeat the position calculations of steps 320 through 338. Alternatively, step 350 permits the conclusion of the routine at step 353.

Field Test Results

Figure 4:
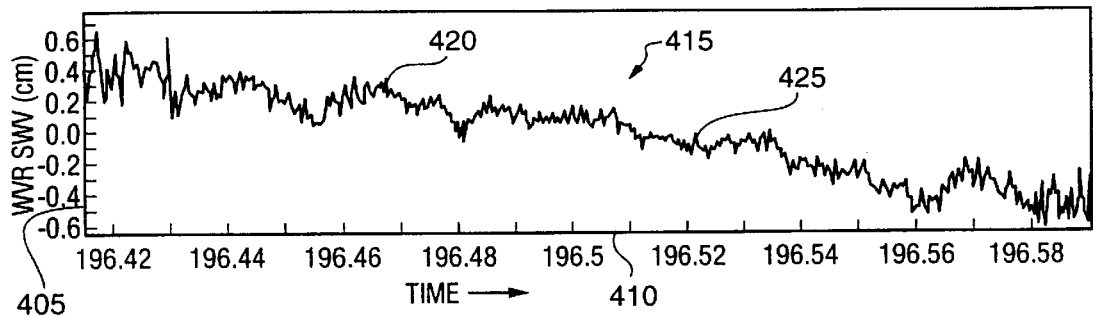
FIG. 4 illustrates slant water vapor measurements that derive from GPS measurements.
Figure 5:
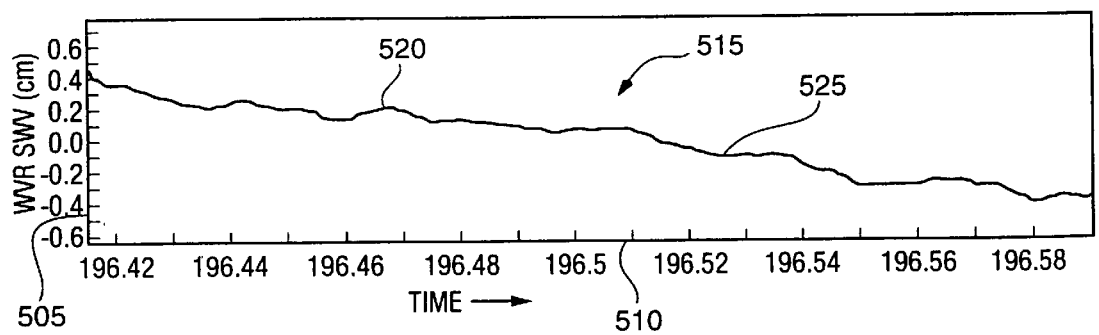
FIG. 5 illustrates slant water vapor measurements that derive from radiometer measurements.

FIGS. 4 and 5

A field experiment used radiometer-based atmospheric water vapor measurements to provide a slant water path delay correction for GPS measurements. GPS receivers, radiometers, and barometers were positioned in sites at Platteville and Table Mountain, Colo. The sites chosen for installation of this equipment were relatively free from obstructions above ten degrees elevation and were separated by 43 km. The GPS receivers chosen were Trimble™ SSI GPS receivers equipped with standard 35 cm diameter TurboRogue™ choke ring antennae augmented with 85 cm choke ring collars mounted on pillars of reinforced concrete. The choke ring antennae and collars were provided to reduce multipath. An elevation cutoff angle of 20° was applied to satellite and radiometer measurements. Barometric data accurate to 0.3 mb was logged every minute.

Radiometrics WVR-1100™ radiometers were pointed sequentially towards each GPS satellite in view to observe at 23.8 and 31.4 GHz for one second in the direction of each satellite during an eight minute observation cycle. These measurements based upon blackbody radiation temperatures and conventional water content algorithms produced slant wet delay with an accuracy of 3 mm, according to the method published in Ware et al, "Pointed Water Vapor Corrections for Accurate GPS Surveying," Geophys. Res. Lett., 20 2635–2638 (1993).

The GPS data were analyzed using the commercially available Bernese software described in Beutler et al, "GPS Software Version 4.0, Univ. Berne, (September, 1996) and the International GPS Service precise orbits published in Neilan, "The Evolution of the IGS Global Network, Current Status and Future Prospects, International GPS Service for Geodynamics, 1994 Annual Report, JPL Pub. 95–18, 25–3 (1995). The software utilized double differencing to minimize GPS receiver and transmitter clock errors. Solutions were computed using conventional zenith corrections according to the prior method of Dixon (1991). These solutions were compared to the slant path water delay calculations according to formulae (1) to (9). Radiometer data were interpolated to the GPS observation times at thirty second intervals. Twenty two hours of data were used for daily solutions over eight days in the fall of 1995 and three days in the spring of 1996.

Table 1 below provides the survey precision and offset for the eleven solution days. Slant corrected vertical precision is 1.2 mm, which is a factor of five better than the 6.0 mm obtained using zenith corrections. Similarly, horizontal coordinates improved by a factor of two to sub-mm precision.

TABLE 1

Slant and Zenith Corrected Precisions for Eleven Solution Days

| Atmospheric path delay correction method | Vertical | North | East |
| --- | --- | --- | --- |
| slant (mm rms) | 1.2 | 0.9 | 0.7 |
| zenith (mm rms) | 6.0 | 1.9 | 1.6 |

Additionally, the zenith-corrected solutions between different surveys in the fall of 1995 and the spring of 1996 showed significant apparent vertical motion (12.2±4.5 mm) that was not seen in the slant corrected solutions (1.5±1.2 mm). Thus, atmospheric effects are believed to contribute errors in the form of perceived monument stability. This error is much greater for zenith corrected solutions in addition to reduced precision of daily measurements.

FIG. 4 depicts a comparison of typical double difference SWV measurements that were sensed using GPS receivers. FIG. 5 is used for comparison against FIG. 4, and represents SWV measurements taken from a radiometer. The radiometer data and the GPS data closely track one another for each case. According to preferred embodiments, it is possible to use modeling techniques as mapping tools to create a body of data that tracks the radiometer measurements in like manner with the GPS-based SWV measurements that are shown in FIG. 4. For example, a GPS receiver may be used to measure atmospheric boundary layer refractivity, e.g., as between the ionosphere and the troposphere, and conventional adaptive filter or neural network modeling methods are applied in mapping the refractivity data to SWD or SWV. The spikes 420 and 425 on the GPS data curve 415 in FIG. 4 are not observed in the corresponding radiometer curve 515 at positons 520 and 525 because the spikes are smoothed by the 5° beam width and the eight minute sampling interval of the radiometers. Thus, it is apparent that the use of GPS receivers to provide SWD or SWV measurements can be even more accurate than the radiometer data.

SUMMARY

The atmospheric water vapor sensing system of the present invention measures refractivity and SWD of slant-path GPS signals transmitted by any one of a plurality of satellite-based GPS transmitters and received by a plurality of Earth-based GPS receivers in a receiver array. Although specific embodiments are disclosed herein it is expected that those skilled in the art can and will design alternative atmospheric water vapor sensing systems that are within the scope of the following claims literally or under the Doctrine of Equivalents.

What is claimed is:

1. In a system having a plurality of radio transmitters, at least one radio receiver, and means for calculating a position based upon signals received at said radio receiver from said plurality of radio transmitters, the improvement wherein said position calculating means comprises:

means for reducing position calculation errors corresponding to atmospheric water delays, wherein said reducing means using data selected from a group consisting of multipath-corrected radiometer measurements, results from a boundary layer refractivity model, tomography profiles, atmospheric water vapor measurements obtained from at least one other radio receiver and, combinations thereof.

2. The system as set forth in claim 1 wherein said position calculating means includes means for generating a root mean square vertical precision with error of less than about 1.2 mm and a root mean square horizontal precision of less than 1 mm.

3. The system as set forth in claim 1 wherein said data consists of multipath-corrected radiometer measurements.

4. The system as set forth in claim 1 wherein said data consists of results form a boundary layer refractivity model.

5. The system as set forth in claim 1 wherein said data consists of a tomography profile.

6. The system as set forth in claim 1 wherein said data consists of atmospheric water vapor measurements obtained from at least one other radio receiver.

7. The system as set forth in claim 1 including a plurality of said radio receivers arrayed in different locations.

8. The stem as set forth in claim 1 including means for calibrating said plurality of receivers.

9. The system as set forth in claim 8 wherein said means for calibrating includes a radio receiver having means for uploading slant path water data up to a satellite.

10. The system as set forth in claim 8 wherein said means for calibrating includes means for deploying a water vapor sensing radiometer proximate to at least one of said plurality of receivers to measure integrated water vapor.

11. The system as set forth in claim 1 including means mounting said radio receiver in fixed positional relationship with respect to the Earth.

12. A high precision method of GPS surveying, said method comprising the steps of:

measuring a plurality of signal propagation times sufficient to permit calculation of a position from said signal propagation times;

correcting said plurality of signal propagation times for slant-path atmospheric water vapor delay to provide a corresponding plurality of corrected signal propagation times; and calculating a position based upon said plurality of signal propagation times, wherein said step of calculating a position includes reducing position calculation errors corresponding to atmospheric water delays through the use of data selected from a group consisting of multipath-corrected radiometer measurements, results from a boundary layer refractivity model, tomography profiles, atmospheric water vapor measurements obtained from at least one other radio receiver and, combinations thereof.

13. The method as set forth in claim 12 wherein said step of calculating a position includes generating a root mean square vertical precision with error of less than about 1.2 mm and a root mean square horizontal precision of less than 1 mm.

14. The method as set forth in claim 12 wherein said data in said step of calculating a position consists of multipath-corrected radiometer measurements.

15. The method as set forth in claim 12 wherein said data in said step of calculating a position consists of results form a boundary layer refractivity model.

16. The method as set forth in claim 12 wherein said data in said step of calculating a position consists of a tomography profile.

17. The method as set forth in claim 12 wherein said data in said step of calculating a position consists of atmospheric water vapor measurements obtained from at least one other radio receiver.

18. The method as set forth in claim 12 including a plurality of said radio receivers arrayed in different locations.

19. The method as set forth in claim 12 including a step of calibrating said plurality of receivers.

20. The method as set forth in claim 19 wherein said means for calibrating includes a radio receiver having means for uploading slant path water data up to a satellite.

21. The method as set forth in claim 19 wherein said means for calibrating includes means for deploying a water vapor sensing radiometer proximate to at least one of said plurality of receivers to measure integrated water vapor.

22. The method as set forth in claim 12 including a step of mounting said radio receiver in fixed positional relationship with respect to the Earth.

* * * * *